United States Patent
Li et al.

(10) Patent No.: US 12,436,608 B2
(45) Date of Patent: Oct. 7, 2025

(54) DEVICE AND METHOD WITH GAZE ESTIMATING

(71) Applicant: Samsung Electronics Co., Ltd., Suwon-si (KR)

(72) Inventors: Weiming Li, Beijing (CN); Qiang Wang, Beijing (CN); Hyun Sung Chang, Suwon-si (KR); Jiyeon Kim, Suwon-si (KR); Sunghoon Hong, Suwon-si (KR); Lin Ma, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 18/072,237

(22) Filed: Nov. 30, 2022

(65) Prior Publication Data

US 2023/0176649 A1    Jun. 8, 2023

(30) Foreign Application Priority Data

Dec. 2, 2021    (CN) .......................... 202111463213.4
Oct. 19, 2022   (KR) .......................... 10-2022-0135197

(51) Int. Cl.
*G06T 7/70* (2017.01)
*G06F 3/01* (2006.01)
(Continued)

(52) U.S. Cl.
CPC ............... *G06F 3/013* (2013.01); *G06T 7/70* (2017.01); *G06V 10/454* (2022.01); *G06V 10/62* (2022.01);
(Continued)

(58) Field of Classification Search
CPC . G06F 3/013; G06T 2207/30201; G06T 7/70; G06V 10/454; G06V 10/62;
(Continued)

(56) References Cited

U.S. PATENT DOCUMENTS 9,775,512 B1    10/2017  Tyler et al.
2012/0131491 A1  5/2012  Lee
(Continued)

FOREIGN PATENT DOCUMENTS

CN    113971822 A  *  1/2022
CN    114565953 A     5/2022
(Continued)

OTHER PUBLICATIONS

L. Dai, J. Liu, Z. Ju and Y. Gao, "Attention-Mechanism-Based Real-Time Gaze Tracking in Natural Scenes With Residual Blocks," in IEEE Transactions on Cognitive and Developmental Systems, vol. 14, No. 2, pp. 696-707,Oct. 5, 2021 (Year: 2021).*
(Continued)

*Primary Examiner* — William C Vaughn, Jr.
*Assistant Examiner* — Astewaye Gettu Zewede
(74) *Attorney, Agent, or Firm* — NSIP Law

(57) ABSTRACT

An electronic device and method with gaze estimating are disclosed. The method includes obtaining target information of an image, the image including an eye, obtaining a target feature map representing information on the eye in the image based on the target information, and estimating a gaze for the eye in the image based on the target feature map. The target information includes either attention information on the image, or a distance between pixels in the image, or both.

20 Claims, 11 Drawing Sheets

(51) Int. Cl.
*G06V 10/44* (2022.01)
*G06V 10/62* (2022.01)
*G06V 10/74* (2022.01)
*G06V 10/771* (2022.01)
*G06V 40/16* (2022.01)

(52) U.S. Cl.
CPC .......... *G06V 10/761* (2022.01); *G06V 10/771* (2022.01); *G06V 40/171* (2022.01); *G06T 2207/30201* (2013.01)

(58) Field of Classification Search
CPC .... G06V 10/761; G06V 10/771; G06V 10/82; G06V 40/171; G06V 40/193
USPC .......................................................... 348/78
See application file for complete search history.

(56) References Cited

U.S. PATENT DOCUMENTS

| | | | |
|---|---|---|---|
| 2019/0212815 A1* | 7/2019 | Zhang | G06V 10/82 |
| 2021/0181837 A1* | 6/2021 | Jiang | G06V 10/764 |
| 2021/0256353 A1 | 8/2021 | Nilsson | |

FOREIGN PATENT DOCUMENTS

| | | | |
|---|---|---|---|
| JP | 2020057875 A | * | 4/2020 |
| KR | 10-2195068 B1 | | 12/2020 |

OTHER PUBLICATIONS

Khosravi, Mohammad Hossein, et al., "Human eye sclera detection and tracking using a modified time-adaptive self-organizing map." Pattern Recognition 41.8 (2008): 2571-2593.
Wang, Zhiyong, et al., "Realtime and Accurate 3D Eye Gaze Capture with DCNN-based Iris and Pupil Segmentation." IEEE transactions on visualization and computer graphics 27.1 (2019): 190-203.
Dai, Lihong, et al. "Attention-Mechanism-Based Real-Time Gaze Tracking in Natural Scenes With Residual Blocks." IEEE Transactions on Cognitive and Developmental Systems 14.2 (2021): 696-707.
Extended European search report issued on May 3, 2023, in counterpart European Patent Application No. 22208305.7 (10 pages in English).
Kellnhofer, Petr, et al. "Gaze360: Physically unconstrained gaze estimation in the wild." *Proceedings of the IEEE/CVF international conference on computer vision.* 2019.
Cheng, Yihua, and Feng Lu. "Gaze estimation using transformer." *arXiv preprint arXiv:2105.14424* (2021).
Dosovitskiy, Alexey, et al. "An image is worth 16x16 words: Transformers for image recognition at scale." *arXiv preprint arXiv:2010.11929* (2020).
Mora, Kenneth Alberto Funes, and Jean-Marc Odobez. "Gaze estimation from multimodal kinect data." *2012 IEEE Computer Society Conference on Computer Vision and Pattern Recognition Workshops.* IEEE, 2012.
Talebi, Hossein, and Peyman Milanfar. "Learning to resize images for computer vision tasks." *Proceedings of the IEEE/CVF International Conference on Computer Vision.* 2021.

* cited by examiner

DEVICE AND METHOD WITH GAZE ESTIMATING

CROSS-REFERENCE TO RELATED APPLICATIONS

This application claims the benefit under 35 USC § 119(a) of Chinese Patent Application No. 202111463213.4 filed on Dec. 2, 2021, in the China National Intellectual Property Administration, and Korean Patent Application No. 10-2022-0135197 filed on Oct. 19, 2022, in the Korean Intellectual Property Office, the entire disclosures of which are incorporated herein by reference for all purposes.

BACKGROUND

1. Field

The following description relates a device and method with gaze estimating.

2. Description of Related Art

Gaze estimation may be used to determine information to which the eyes of a user are attending (i.e., where a user's visual attention or focus is directed). Gaze estimation may be widely applicable in various fields including, for example, augmented reality (AR), human-computer interaction, or the like. Various research is under development to improve the accuracy of gaze estimation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method performed by an electronic device includes obtaining target information of an image, the image including an eye, obtaining a target feature map representing information on the eye in the image based on the target information, and performing gaze estimation for the eye in the image based on the target feature map. The target information may include attention information on the image, or a distance between pixels in the image, or both.

The attention information may include temporal relationship information between at least two frame images, and the obtaining of the target feature map may include obtaining the target feature map of the image based on a first feature map of the at least two frame images and the temporal relationship information between the at least two frame images.

The attention information may include frontal facial features of a face or head, and the obtaining of the target feature map may include obtaining the target feature map based on a second feature map of a specific portion of the image and the frontal facial features. The specific portion may include one or at least two of eye, mouth, nose, ear, and eyebrow portions of the face or head.

The attention information may include temporal relationship information between at least two frame images and frontal facial features of the face or head, and the obtaining of the target feature map may include obtaining a third feature map of the image based on the frontal facial features and a second feature map of a specific portion of the image, and obtaining the target feature map based on a third feature map of the at least two frame images and the temporal relationship information between the at least two frame images.

The frontal facial features may be determined based on obtaining a facial map and a facial mask of the image, obtaining a first front image based on the image, the facial map, and the facial mask, and obtaining the frontal facial features based on the first front image. The facial map may include an offset of each pixel of a face in the image, and the facial mask may cover a region other than the face in the image.

The obtaining of the first front image may include obtaining, based on the image, the facial map, and the facial mask, a second front image comprising a region of facial data, the region of facial data surrounding a hole region that lacks facial data, obtaining a hole mask of the second front image and a third front image based on the second front image, and obtaining the first front image based on the second front image, the hole mask, and the third front image. The hole mask may mask an image region other than the hole region in the second front image, and the third front image may include an image region corresponding to a position of the hole region in the second front image.

The target information may include the distance between pixels, and the obtaining of the target feature map may include obtaining the target feature map based on a fourth feature map of the image and relative distance information between the pixels.

The target information may include weight information. The obtaining of the target information may include obtaining a first weight map of the image based on a fifth feature map of the image, and the obtaining of the target feature map may include obtaining the target feature map based on the first weight map and the fifth feature map.

The attention information may include weight information. The obtaining of the target information may include obtaining a second weight map based on a position of the eye in the image, and the obtaining of the target feature map may include obtaining the target feature map based on the second weight map and a sixth feature map of the image. The sixth feature map may be obtained by extracting features from the image through at least two convolutional layers.

The obtaining of the target feature map may include obtaining a seventh feature map based on the second weight map and an intermediate feature map, and obtaining the target feature map based on the sixth feature map and the seventh feature map. The intermediate feature map may be a feature map output by a target layer among the at least two convolutional layers.

The performing of the gaze estimation may include performing the gaze estimation on the image based on the target feature map and target pose information. The target pose information may be pose information of a target portion in the image.

In another general aspect, an electronic device includes a processor and a memory including instructions executable by the processor. When the instructions are executed by the processor, the processor is configured to obtain target information of an image including an eye, obtain a target feature map representing information on the eye in the image based on the target information, and perform gaze estimation on the eye included in the image based on the target feature map. The target information includes either attention information on the image, a distance between pixels in the image, or both.

The hole region may be a region of the second front image that was not generated based on the image, the facial map, and the facial mask Other features and aspects will be apparent from the following detailed description, the drawings, and the claims.

Figure 1:
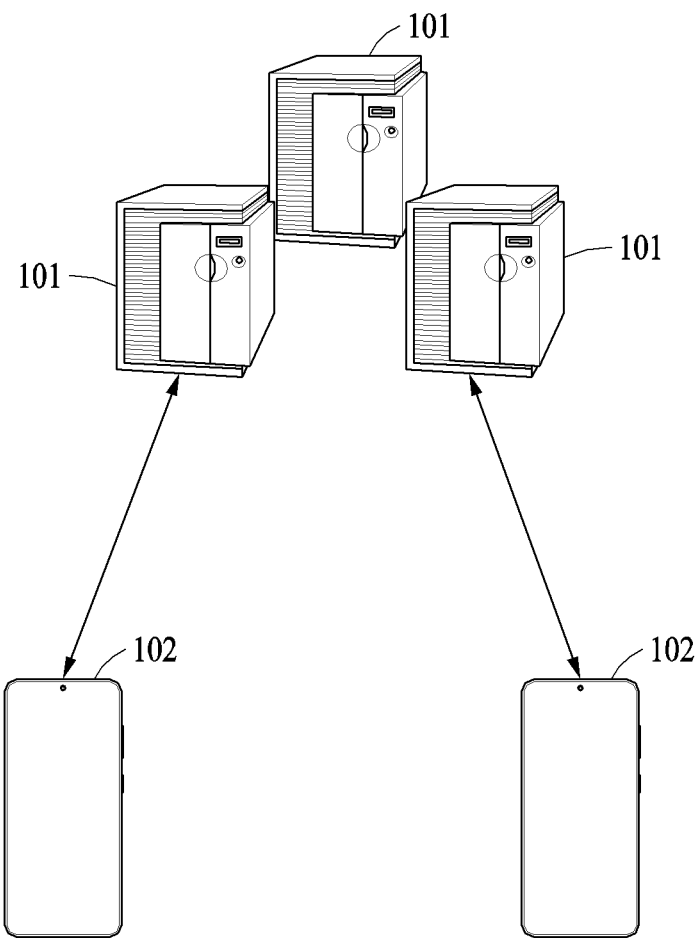
FIG. 1 illustrates an example of an environment in which an electronic device for estimating a gaze may operate, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like components and a repeated description related thereto is omitted.

Gaze estimation methods described herein may use artificial intelligence (AI), machine learning, computer vision, or the like. For example, AI may be used to recognize and estimate a gaze direction of an eye in an image. For another example, image recognition and image semantic understanding (computer vision) may be used to perform gaze estimation based on features extracted from an image. For another example, technology such as machine learning/deep learning may be used to perform reinforcement learning in a process of estimating a gaze. For example, an AI model may be used to perform gaze estimation on a large number of images. In this example, the AI model may be obtained through training. Such training may involve obtaining a predefined operation rule or AI model that is configured to perform a desired feature (or goal) by training a basic AI model one or more sets of training data through a training algorithm. The AI model may include neural network layers. Each of the neural network layers may include weight values. A neural network computation of a given layer may be performed by a calculation between a calculation result from a previous layer and weight values of the given layer.

AI methods and/or systems may sense an environment, learn from information, obtain an optimized result using the learned information, and so forth. AI models and algorithms may provide devices with sensing, reasoning, and deciding functions based on design principles and implementation methods of various intelligent devices.

AI technology is applicable to a wide range of technical fields such as, for example, sensors, dedicated AI chips, cloud computing, distributed storage, bigdata processing methods, motion/interaction systems, and electromechanical integration. The AI technology may also include other technologies, such as, for example, computer vision, speech processing, natural language processing, and machine learning/deep learning. Among these, computer vision and machine learning/deep learning may be related hereto.

Machine learning (or ML) may cover various fields, such as, for example, probability theory, statistics, approximation theory, convex analysis, and algorithm complexity theory. ML may be applicable in various fields of AI. ML and deep learning may generally include learning technologies, such as, for example, learning from artificial neural networks, belief networks, reinforcement learning, transfer learning, inductive learning, unsupervised learning, and demonstrations.

Computer vision (or CV) may relate to how to machines derive information from images. For example, CV may involve a computer recognizing, tracking, or measuring a target captured by a camera. A CV technology may generally include image processing, image recognition, image semantic understanding, image search, optical character recognition (OCR), video processing, video semantic understanding, video content/behavior recognition, three-dimensional (3D) object reconstruction, 3D technology, virtual reality (VR), augmented reality (AR), synchronous positioning and map construction, autonomous driving, smart transportation, or the like. CV technology may also include biological feature recognition such as facial recognition and fingerprint recognition.

Hereinafter, an environment in which an electronic device operates will be described with reference to FIG. 1.

FIG. 1 illustrates an example of an environment in which an electronic device for estimating a gaze may operate, according to one or more embodiments.

Referring to FIG. 1, in an environment where electronic devices operate, one or more electronic devices 101 may be included. An electronic device 101 may estimate a gaze of a user in an image using gaze estimation methods described herein and obtain gaze information of an eye in the image.

In the environment, other electronic devices 102 may be further included as illustrated in FIG. 1. The other electronic devices 102 may provide images to the electronic devices 101. The electronic devices 101 and the other electronic devices 102 may be connected through communication, for example through a network. For example, an electronic device 102 may transmit an image to an electronic device 101, and the electronic device 101 may receive the image transmitted from the electronic device 102 and perform gaze estimation on the image. For another example, an electronic device 102 may be a terminal, and the terminal may transmit a request for gaze estimation including an image to an electronic device 101. In this example, the terminal may include, for example, a cellphone, a vehicle, or the like. For another example, an electronic device 102 may transmit an image to be used for model training to an electronic device 101, and the electronic device 101 may train a model used for gaze estimation based on the image transmitted from the electronic device 102 and perform gaze estimation on the image using the trained model.

Gaze estimation methods described herein may relate to three-dimensional (3D) gaze estimation applicable to various scenarios. For example, in a scenario of human-computer interaction, an electronic device 101 may use the gaze estimation method described herein to infer what a user pays attention to, further understand the purpose thereof, and perform a corresponding action. For example, in an augmented reality (AR) meeting activity, an electronic device 101 may use the gaze estimation method described herein to infer which people pay attention to a user and which people greet the user, thereby allowing the user to approach them to shake hands or greet them. For another example, an electronic device 101 may estimate a direction of a gaze in assisted driving, use the gaze direction to determine a target to which the eyes of a person pay attention, and provide corresponding information accordingly.

In addition, an electronic device 101 may be a server, a service cluster, a cloud service, or an electronic device that has a data processing function. The server may be an independent physical server, or a server cluster or distributed system including multiple physical servers. Alternatively, the server may be a cloud server or server cluster that provides a basic cloud computing service such as a cloud service, a cloud database (DB), cloud computing, a cloud function, a cloud storage, a network service, cloud communication, a middleware service, a domain name service, a security service, a content delivery network (CDN), bigdata, and/or an artificial intelligence (AI) platform. The network described above may include a wired network and/or a wireless network. A wired network may include a local area network (LAN), a metropolitan area network (MAN), and wide area network (WAN). The wireless network may include Bluetooth, Wi-Fi, and other networks implementing wireless communication, but is not limited thereto. An electronic device 102 may be, for example, a smartphone (e.g., Android phone, iOS phone, etc.), a tablet personal computer (PC), a laptop PC, a digital broadcasting receiver, a mobile Internet device (MID), a personal digital assistant (PDA), a desktop PC, a vehicle terminal (e.g., a vehicle navigation system terminal, a vehicle computer terminal, etc.), a smart speaker, a smartwatch, or the like, which may be used as a terminal or a camera, but is not limited thereto. An electronic device 101 and another electronic device 102 may be directly or indirectly connected through wired or wireless communication but are not limited thereto. For example, it may be determined based on what is requested by an actual application scenario, which is not specified herein. In some embodiments a single device may capture an image and also perform gaze estimation.

Hereinafter, technical solutions and effects according to example embodiments of the present disclosure will be described. The following example embodiments may refer to other example embodiments described herein or be combined with other example embodiments, and repeated descriptions of the same terms, similar characteristics, and similar operations for implementation may be omitted for simplicity.

Figure 2:
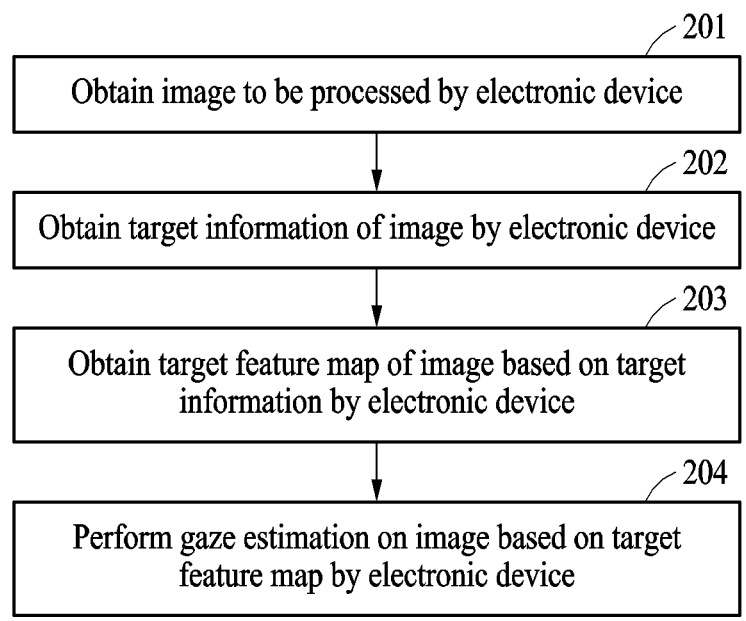
FIG. 2 illustrates an example of a method of operating an electronic device, according to one or more embodiments.

FIG. 2 illustrates an example of a method of operating an electronic device, according to one or more embodiments.

Operations described below may be performed in sequential order but may not be necessarily performed in sequential order. For example, the order of the operations may be changed, and at least two of the operations may be performed in parallel. Operations 201 to 204 described below may be performed by one or more components (e.g., a processor, a sensor, etc.) of an electronic device.

In operation 201, the electronic device may obtain an image to be processed.

The image may be an image including an eye. The eye may be an eye of an object. The image may include, for example, an eye image of a user, an eye image of an avatar (e.g., a virtual game character used by a user in a game), an eye image of an animation character, an eye image of a companion animal, but examples of which are not limited thereto. The image may be an image including a face or a portion of a face. For example, the image may be a face image of a user. In this example, a gaze of an eye on the face of the user included in the face image may be estimated. The image may include eyes or faces of one or more objects. The number of eyes or faces in the image is not limited herein. The image might have been captured any time before gaze estimation is to be performed, i.e., the image might be obtained from a storage device, a storage service, etc.

The image may be an image stored in the electronic device or an image obtained from an image acquisition device. In a first scenario, the electronic device may obtain, in real time, an image from a client, perform gaze estimation on the image, store a result of the gaze estimation, perform a subsequent process based on the result of the gaze estimation, and transmit back the result of the gaze estimation to another device or the client performing a subsequent operation. A method of obtaining an image and a process to be performed after obtaining a result of gaze estimation are not limited herein to specific ones.

In operation 202, the electronic device may obtain target information of the image.

The target information may include attention information and/or a distance between pixels in the image.

For example, the attention information may include frontal facial features. For another example, the attention information may include temporal relationship information between at least two frame images (hereafter "two frame images" refers to two or more frame images), and the two frame images may have image features described above. For still another example, the attention information may include the temporal relationship information between the two frame images and the frontal facial features.

The target information may also include the distance between pixels. Alternatively, the target information may include weight information. In various possible situations described above, operation 202 may be implemented as described in accordance with any one or more of the following six example methods.

In a first method, attention information may include frontal facial features. The electronic device may obtain a first front image based on an image and may obtain a facial map of the image. The electronic device may obtain the frontal facial features based on the first front image.

The first front image may include the front of a face in the image. The facial map may include an offset of each pixel of the face in the image with respect to the front of the face. The electronic device may obtain the first front image by offsetting each pixel of the face in the image based on the facial map.

After a position of the face is offset, a hole, an omitted contour, an omitted pixel, or the like may be generated. The electronic device may additionally fill an omitted portion (e.g., a hole, an omitted contour, an omitted pixel, etc.) in the offset image, and may thereby obtain a front image of the entire face. This operation of obtaining the first front image based on the image and the facial map of the image by the electronic device may include obtaining a second front image (which includes a position/hole to be filled) by offsetting each pixel of the face in the image based on the facial map, and obtaining the first front image by filling the omitted/missing portion of the second front image. For example, the filling of the omitted/missing portion (i.e., supplementing the position to be filled) in the second front image may produce an image of the entire face. For example, the position to be filled may include, for example, the hole, an omitted contour, an omitted pixel, or similar artifacts that can be generated by the pixel offset, but is not limited thereto.

In an example, the electronic device may obtain the first front image by combining a facial mask of the image. In the first method, operation 202 may be implemented through the following operations 2021A to 2023A (not shown).

In operation 2021A, the electronic device may obtain the facial map and the facial mask of the image.

The facial mask may correspond to a region in the image that is not the face. The electronic device may obtain the facial map and the facial mask based on the image. The electronic device may obtain an eighth feature map of the image and obtain the facial map and the facial mask of the image based on the eighth feature map of the image.

In an example, the electronic device may implement operation 2021A through a transformer network. For example, the electronic device may input the image to the transformer network, obtain the eighth feature map of the image through an encoder of the transformer network, and obtain the facial map and the facial mask through a convolutional layer and a fully connected layer of the transformer network based on the eighth feature map.

In operation 2022A, the electronic device may obtain the first front image based on the image, the facial map, and the facial mask.

The electronic device may obtain the second front image (which has a position to be filled) based on the image, the facial map, and the facial mask, and then obtain the first front image by filling, with the image, the position to be filled in the second front image.

In an example, the electronic device may generate a third front image based on the second front image. The third front image may include an image region corresponding to the position to be filled in the second image, and the electronic device may fill the image using the third front image. Operation 2022A may be implemented through the following operations A1 to A3 (not shown).

In operation A1, the electronic device may obtain the second front image based on the image, the facial map, and the facial mask.

The second front image may include the position to be filled. The electronic device may obtain the second front image by applying the mask to the image to determine a face and moving each pixel of the face based on the facial map.

For example, the facial map may reflect therein an offset of each pixel of the face in the face image of the front face. The electronic device may obtain a front face image by moving each pixel in a facial region that is not covered by the facial mask in the face image based on the facial map, the facial mask, and the face image.

In an example, the electronic device may fill the position to be filled using a mask. The electronic device may obtain a hole mask through operation A2.

In operation A2, the electronic device may obtain the hole mask of the second front image and the third front image based on the second front image.

The third front image may include an image region corresponding to a position of a hole to be filled, and the hole mask may be used to cover an image region other than the position (i.e., the hole) to be filled in the second front image.

Figure 3:
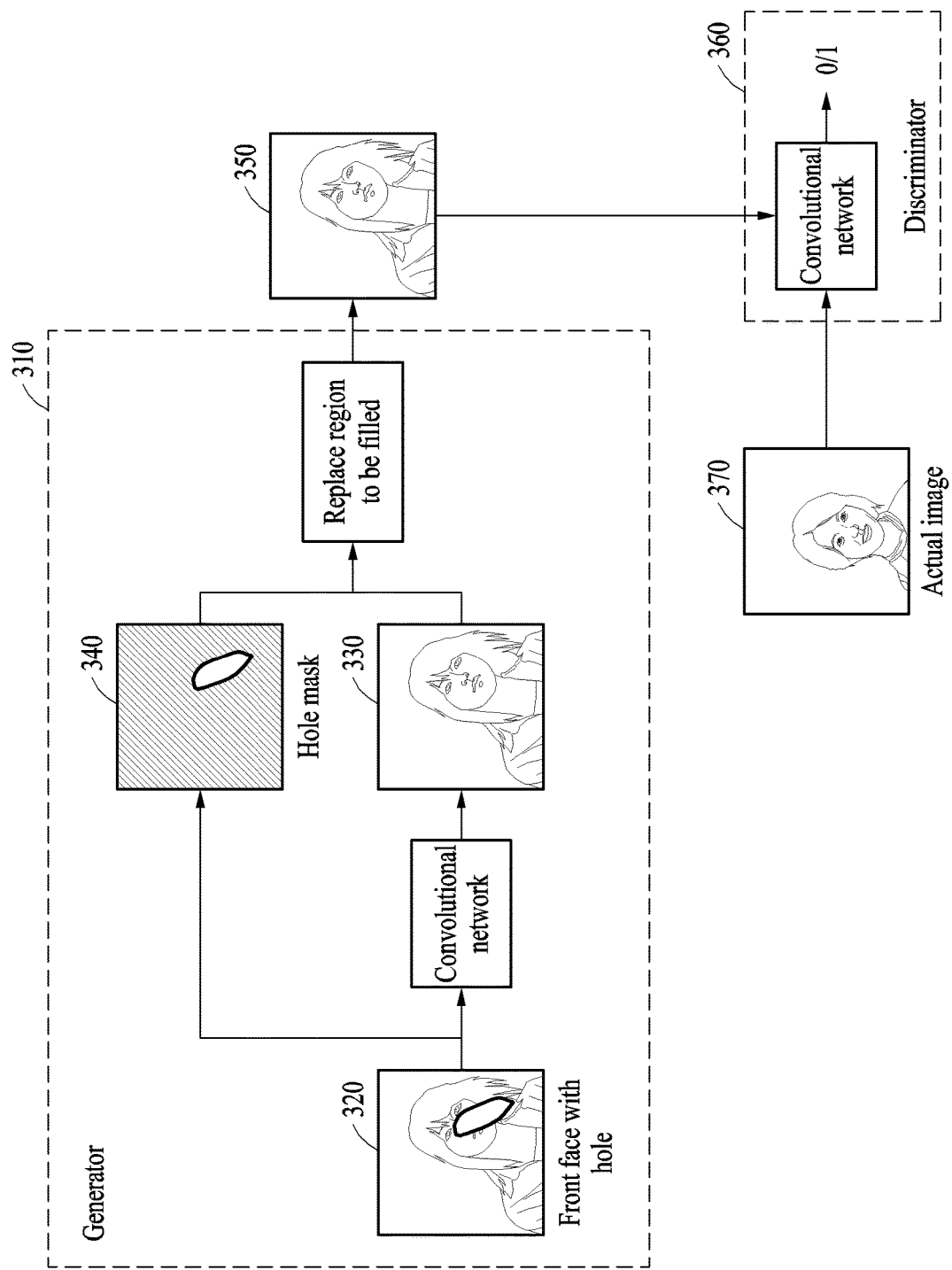
FIG. 3 illustrates an example of filling a hole in an image, according to one or more embodiments.

In an example, the electronic device may obtain the third front image and the hole mask through a generative adversarial network (GAN) (see, for example, the generator and discriminator shown in FIG. 3). For example, the electronic device may input the second front image to the GAN, and generate the hole mask of the second front image and the third front image corresponding to the second front image through the GAN.

In operation A3, the electronic device may obtain the first front image based on the second front image, the hole mask, and the third front image.

The electronic device may obtain the first front image by filling the position to be filled in the second front image with the image based on the hole mask and the third front image. The electronic device may obtain the first front image by determining a position corresponding to the position to be filled in the third front image based on the hole mask and filling, with the image, the position to be filled in the second front image based on a face image at the position corresponding to the third front image.

In an example, the third front image may include an entire face corresponding to the face in the second front image, and a position of the entire face may include a face image corresponding to the position of the face in the second front image and the position to be filled in the face of the second front image.

For example, the electronic device may obtain the first front image through the GAN. As illustrated in FIG. 3, the GAN may include a generator 310 and a discriminator 360. In this example, through the generator 310 of the GAN, a third front image 330 and a hole mask 340 may be obtained based on a second front image 320, and a first front image 350 may be obtained by filling a region that is not covered by the hole mask 340 in the third front image 330 with the second front image 320 based on the hole mask 340 and the third front image 330. The GAN may further include the discriminator 360, and may be trained with the generator 310 and the discriminator 360. For example, the discriminator 360 may discriminate between an image (i.e., the first front image 350) estimated by the generator 310 and an actual image 370. In this example, the discriminator 360 may determine a probability that the image estimated by the generator 310 is the actual image 370 (i.e., is not a fake/generated image). The GAN may be trained by adjusting parameters of the GAN based on the image estimated by the generator 310 and a result of discriminating the estimated image by the discriminator 360.

In operation 2023A, the electronic device may obtain the frontal facial features based on the first front image.

The electronic device may obtain the frontal facial features by extracting features from the first front image. In an example, the electronic device may obtain the frontal facial features by extracting the features from the first front image through a transformer network, as described later.

In a second method, the attention information obtained by the electronic device may include temporal relationship information between two frame images.

The two frame images may include an image such as the image to be processed in operation 201. In an example, the electronic device may obtain the temporal relationship information based on an image capture time. In the second method, operation 202 may be implemented through the following operations 2021B and 2022B (not shown).

In operation 2021B, the electronic device may obtain the image capture time of each frame image of the two frame images.

The two frame images may be images with different capture times. In an example, the electronic device may obtain a target number of frame images that is close to the number for capturing. The target number may be set as needed. For example, the target number may be 6, 8, 20, or the like, but the number of the two or more captured frame images is not limited thereto. For example, when an image is a kth frame image, an image collection time of a total of seven frame images, for example, a k-6th frame image (i.e., a frame 6 frames before the kth frame), a k-5th frame image, . . . , a k-1th frame image, and the kth frame image, may be obtained.

In operation 2022B, the electronic device may obtain the temporal relationship information based on the image capture time of each frame image of the two frame images.

The temporal relationship information may indicate a preceding/following order in the image capture time of the two frame images. The electronic device may obtain the temporal relationship information by sequentially arranging the two frame images based on the image capture times of the two frame images. For example, the electronic device may obtain the image collection time of the seven frame images in the preceding/following order (e.g., 7, 6, 5, 4, 3, 2, 1) by arranging the respective image collection times of the total of seven frame images, for example, the k-6th frame image, the k-5th frame image, . . . , the k-1th frame image, and the kth frame image.

In a third method, the attention information may include temporal relationship information between two frame images and frontal facial features. The electronic device may obtain the first front image based on the image and the facial map of the image, and obtain facial features based on the first front image. In addition, the electronic device may obtain the temporal relationship information between the two frame images.

A process in which the electronic device obtains the frontal facial features may be the same as the process in which the electronic device obtains the frontal facial features in the first method. For example, through the same process of operations 2021A to 2023A, a front image may be obtained. In addition, a process in which the electronic device obtains the temporal relationship information may be the same as the process in which the electronic device obtains the temporal relationship information in the second method. For example, the temporal relationship information may be obtained through the same process of operations 2021B to 2023B. Thus, a more detailed description of obtaining the frontal facial features and the temporal relationship information will be omitted here for conciseness.

In a fourth method, the target information may include a distance between pixels in an image. The electronic device may obtain the distance between the pixels in the image.

In an example, the distance between the pixels may be represented as relative distance information between the pixels. The electronic device may obtain the relative distance information through features of the image. For example, in the fourth method, operation 202 may be implemented through the following operations 2021C to 2023C (not shown).

In operation 2021C, the electronic device may obtain a fourth feature map of the image.

In an example, the fourth feature map is obtained by extracting features of the image, obtaining a ninth feature map, and performing downsampling on the ninth feature map. For example, the electronic device may input the image to a feature extraction network, extract the features from the image through the feature extraction network, and obtain the ninth feature map output from the feature extraction network. The ninth feature map of the image may be extracted through a convolutional neural network (CNN), for example.

The downsampling whose use is described later may involve representing features of a relatively low-resolution feature map using a relatively high-resolution feature map. In an example, the electronic device may perform the downsampling in a unit of feature points. Obtaining the fourth feature map by performing the downsampling on the ninth feature map may be based on obtaining a plurality of first feature points by downsampling the ninth feature map, determining second feature points corresponding to the first feature points in the ninth feature map, obtaining a feature vector of the first feature points based on the second feature points, and obtaining the fourth feature map from the feature vector of the first feature points. The fourth feature map may include the first feature points and the feature vector of the first feature points. In this example, a resolution of the ninth feature map may be greater than that of the fourth feature map. For example, the first feature points and the second feature points may be associated at corresponding positions in the ninth feature map. In this example, a second feature point may be a point obtained by projecting a first feature point onto the ninth feature map. For example, the electronic device may obtain positions at which the first feature points are projected in the ninth feature map by using bilinear interpolation based on the positions of the first feature points in the ninth feature map. The second feature points may be projected points of the first feature points in the ninth feature map. For example, when an image Q has a given resolution of H×W, it may be reduced to a feature map q of a low-resolution h×w through the downsampling. In this example, the resolution of the image Q may be greater than that of the feature map q. This low-resolution feature map may include at least one feature channel, and the low-resolution feature map may have three channels, for example. The low-resolution feature map may be a representation of features of an image, and may not be necessarily an image.

In an example, the electronic device may obtain the feature vector of the first feature points through feature extraction. This process may include obtaining the second feature points at positions corresponding to the first feature points in the ninth feature map by projecting the first features points to the ninth feature map, and obtaining the feature vector of the first feature points by extracting features of the second feature points from the ninth feature map. For example, the electronic device may extract a feature vector of a pixel at an upper left end position of a second feature point as a feature of a first feature point. Through the feature extraction described above, the electronic device may obtain a feature vector of each of the first feature points. The fourth feature map may include the feature vectors of the first feature points.

For example, the electronic device may project, to the ninth feature map, a first point P on a first intermediate feature map through bilinear interpolation to obtain a projected point P' that is projected on the ninth feature map corresponding to the point P. A feature vector of the point P may be extracted at a position of a pixel at an upper left end of the point P'. For example, when, for a point (1, 1) on a low-resolution 100×100 feature map, four points included in a projection region of a 200×200 feature map are (2, 2), (2, 3), (3, 2), and (3, 3); a feature vector of the point (2, 2) of the 200×200 feature map, for example, may be determined as a feature vector of the point (1, 1) of the 100×100 feature map.

In another example, the electronic device may extract features from the image to obtain the fourth feature map. For example, the electronic device may input the image to a feature extraction network, extract the features from the image through the feature extraction network, and obtain the fourth feature map output from the feature extraction network. For example, the electronic device may extract the fourth feature map of the image through a CNN, for example.

In operation 2022C, the electronic device may obtain the relative distance information based on the fourth feature map.

In an example, when obtaining the fourth feature map through the downsampling, the electronic device may determine the relative distance information based on the second feature points corresponding to the first feature points in the ninth feature map.

For example, the electronic device may obtain relative distance information of a corresponding first feature point based on a relative position between a second feature point and a neighboring point. In an example, for at least one first feature point of the fourth feature map, the electronic device may obtain at least one distance between a corresponding second feature point and a neighboring point, and obtain relative distance information of the first feature point based on the at least one distance. In an example, the electronic device may obtain the relative distance information of the first feature point through a distance function based on the at least one distance, and the relative distance information may include a distance function value corresponding to the at least one distance. For example, the electronic device may calculate at least one distance function value corresponding to the at least one distance through at least one distance function. In this example, the distance function may map between a distance and a distance function value. For example, each first feature point may correspond to at least one distance function value, and the electronic device may combine the at least one distance function value of each first feature point and obtain the relative distance information of an image feature. For example, the electronic device may obtain relative distance information corresponding to a feature map.

In an example, a quantity of distance function values may be greater than a quantity of corresponding distances. For example, each distance may correspond to one or more distance function values, and each distance pair may correspond to one or more distance function values. A relationship between a distance and a distance function value provided by a distance function may be configured in advance, and the electronic device may obtain at least one distance function value using at least one distance function.

For example, the electronic device may form a polygon based on neighboring points and obtain at least one distance based on the formed polygon. For example, the polygon may be a rectangle, and the electronic device may obtain a neighboring point of a second feature point in the ninth feature map, determine a rectangle corresponding to the neighboring point, and use a distance between the second feature point and a side of the rectangle as at least one distance between the second feature point and the neighboring point. For example, the electronic device may obtain four neighboring points and connect the four neighboring points to obtain a rectangle, and obtain four distances between the second feature points and respective sides of the rectangle. Alternatively, the electronic device may form another polygon, for example, a triangle, a pentagon, a hexagon, or the like, and obtain at least one distance based on the other polygon.

Figure 4:
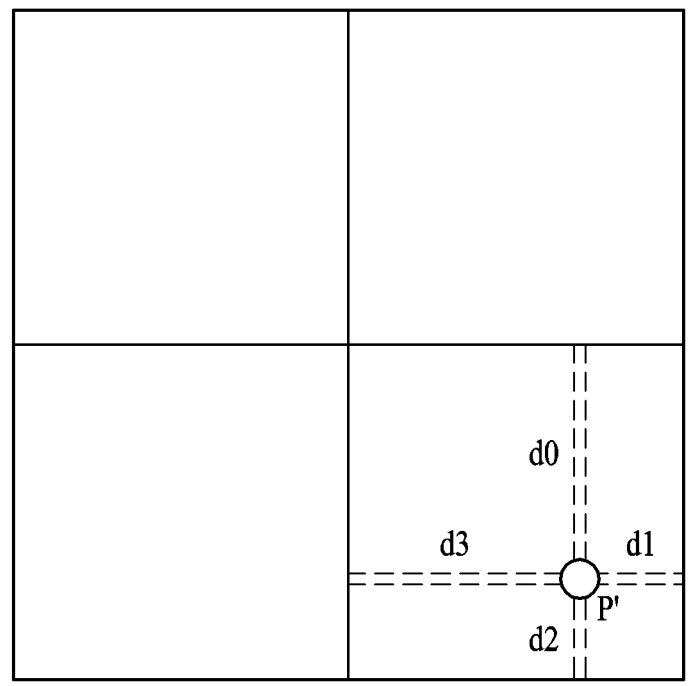
FIG. 4 illustrates an example of a distance between pixels, according to one or more embodiments.

FIG. 4 illustrates an example 400 of obtaining four distances by forming a rectangle. For example, as illustrated in FIG. 4, the electronic device may form a rectangle at a lower right end by connecting neighboring four points near a second feature point P'. In this example, respective distances between the second feature point P' and respective four sides of the rectangle may be d0, d1, d2, and d3. The electronic device may generate at least one direction function value based on d0, d1, d2, and d3. In this example, when values of two of four distances between a point and respective sides of a rectangle are determined, a single distance between the second feature point and the sides of the rectangle may be determined. Thus, the electronic device may generate N distance function values based on d0 and d1. The N distance function values may be f1(d0, d1), f2(d0, d1) . . . , and fN(d0, d1), in which f1, f2, . . . , and fN may each denote a distance function. For example, relative distance information of a first feature point P may be represented as vector v, and v may be [f1(d0, d1), f2(d0, d1) fN(d0, d1)] (e.g., v=[f1(d0, d1), f2(d0, d1) . . . fN(d0, d1)]. In this example, N may be a positive integer, and f, and fN may be a function. By combining relative distance information from each first feature point, the electronic device may obtain a relative distance information map which is represented as h×w×N, in which h×w may represent the size of a feature map corresponding to the fourth feature map.

Figure 5:
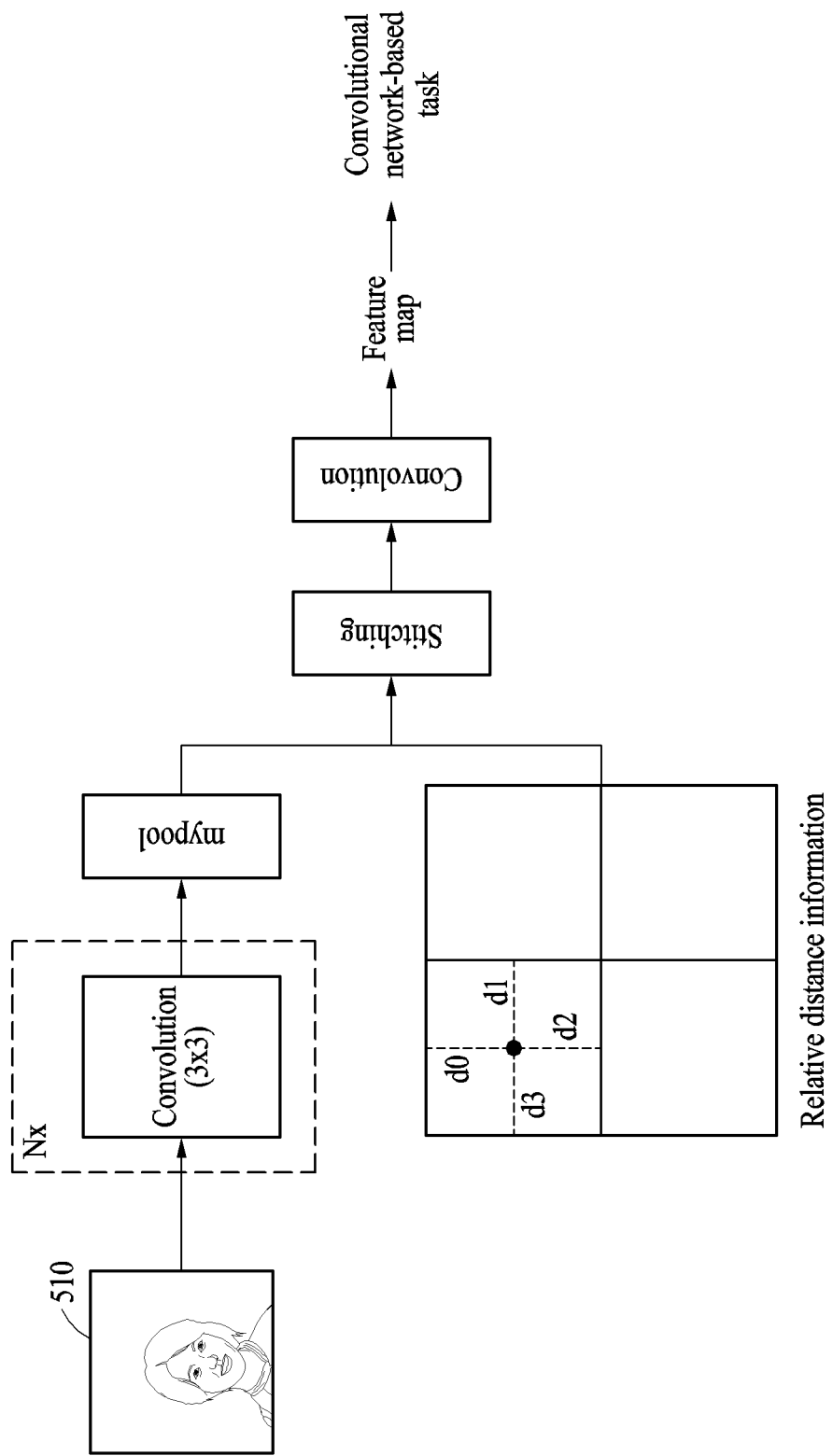
FIG. 5 illustrates an example of obtaining a target feature map, according to one or more embodiments.

Operations 2021C and 2022C may be implemented using a CNN. For example, in the CNN, a downsize network (e.g., DownsizeNet) may be designed, and operations 2021C and 2022C may be performed through the downsize network. FIG. 5 illustrates an example of convolutional network-based image reduction, according to one or more embodiments. For example, as illustrated in FIG. 5, the electronic device may input an original image 510 to a convolutional network, and may obtain the ninth feature map by extracting features from the original image 510 through convolution with a 3×3 kernel size. The electronic device may then perform downsampling on the ninth feature map through mypool (or a downsampling operation) to obtain the fourth feature map. The fourth feature map may include a plurality of first feature points and a feature vector of the first feature points. In this example, mypool may be used to downsample at a non-integer sampling rate. For example, the electronic device may obtain a feature map of a low-resolution 70×70 by downsampling a feature map of 100×100. In this example, 100 may not be an integer multiple of 70, but a point of the 70×70 low-resolution feature map may be projected, e.g., linearly, at a corresponding projection point of the 100×100 feature map, and a feature vector of a pixel at an upper left end of the projection point may be extracted and used as a feature vector of points of the low-resolution feature map. Through the downsampling with the non-integer sampling rate, it is possible to down sample a low-resolution feature map of size as needed and resolve a limitation in terms of the size of a feature map, and improve the applicability of the downsize network. In such a case, parameters of the network may be floating point values. In addition, the electronic device may obtain relative distance information based on the fourth feature map and stitch the fourth feature map and the relative distance information in a subsequent operation to obtain a target feature map. The electronic device may further perform convolution on the newly obtained target feature map to obtain a final target feature map. The electronic device may input the target feature map to various networks such as network models, for example, a visual geometry group network (e.g., VGG16) or a residual network (ResNet), to use it for post-processing to perform an entire task. For example, a loss function of the entire task may be used to train the downsize network, and parameters of the downsize network may be adjusted. In this operation, various activation functions and a batch processing operation may be designed and used in the CNN, but examples are not limited thereto.

In another example, when directly obtaining the fourth feature map by extracting features from the image, the electronic device may obtain relative distance information based on a relative position between each first feature point and a neighboring point in the fourth feature map. For example, the electronic device may calculate at least one distance between a first feature point and a neighboring point in the fourth feature map and obtain relative distance information of the first feature point based on the at least one distance. For example, the electronic device may also obtain the at least one distance by forming a polygon. A method of obtaining at least one distance and obtaining relative distance information based on the at least one distance may be the same as the foregoing method of obtaining at least one distance and obtaining relative distance information through downsampling in the method of obtaining a fourth feature map.

The electronic device may obtain a distance between a second feature point and a neighboring point by forming a polygon, and may also obtain the distance in another way. However, other methods of determining a distance between a second feature point and a neighboring point may be used. For example, the electronic device may directly calculate a straight distance between a second feature point and a neighboring point. Also, the electronic device may form a pentagon to obtain five distances between a second feature point and corresponding five sides, or form a hexagon to obtain corresponding six distances, and so forth.

In a fifth method, the target information may include weight information. The electronic device may obtain a first weight map of the image based on a fifth feature map of an image.

The first weight map may include weight information of the image. A weight map used herein may represent weight information of an image. For example, in the fifth method, operation 202 may be implemented through the following operations 2021D and 2022D (not shown).

In operation 2021D, the electronic device may obtain the fifth feature map of the image.

Figure 6:
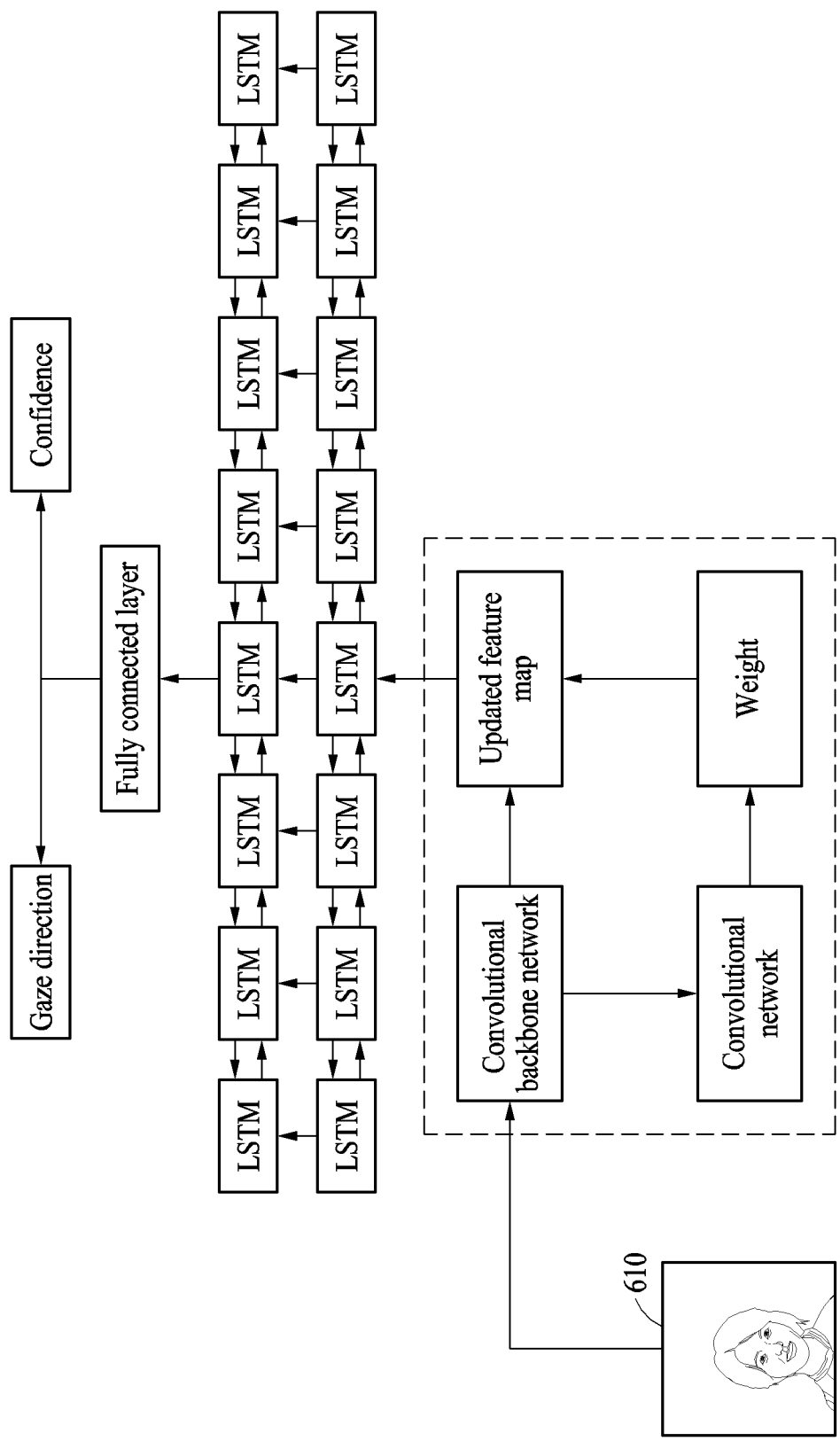
FIG. 6 illustrates an example of estimating a gaze, according to one or more embodiments.

The electronic device may extract features from the image using a CNN, for example, to obtain the fifth feature map. For example, as illustrated in FIG. 6, the electronic device may extract features from a face image 610 using the CNN and obtain a fifth feature map of the face image 610.

In operation 2022D, the electronic device may obtain the first weight map of the image based on the fifth feature map.

The first weight map may represent importances, or weights, of positions in the image. The first weight map may include weight information of each feature point in the first feature map. The weight information used herein may be in the form of weights, and a weight may have a positive correlation with the importance. As the weight increases, the importance of a corresponding feature point may increase. In an example, the electronic device may perform convolution on the fifth feature map through the convolutional layer to obtain the first weight map of the image.

In a sixth method, the target information may include weight information. The electronic device may obtain a second weight map of an image based on (and reflecting) a position of an eye in the image.

The second weight map may include the weight information of the image. A weight map used herein may represent weight information of an image. In an example, the electronic device may detect the eye in the image and obtain the position of the eye in the image to obtain the second weigh map based on the position of the eye in the image.

In a similar way to the fifth method described above, the second weight map may include weight information of an image. The weight information may be in the form of weights, and a weight may have a positive correlation with the importance. As the weight increases, the importance of a corresponding feature point may increase. In the sixth method, the electronic device may obtain the second weight map by, after determining the position of the eye in the image, assigning a greater weight to the position of the eye in the image, than a position that does not correspond to the eye.

The assigning of the greater weight to a position of the eye in the image than a position that does not correspond to the eye may be performed by processing data in a way to increase a weight value of the position of the eye, and the importance of a position of the eye may thereby increase. For example, the weight of a position of the eye may be set not to be smaller than A and the weight of a position that is not a position of the eye in the image may be set not to be greater than B. In this example, A may be set to be greater than B. This setting may create a bias that enables effective discrimination between the position of the eye in the image and another position. For example, the electronic device may detect the eye in the image using a multi-task cascaded convolutional network (MTCNN). In this example, the electronic device may detect an eye in a face image through the MTCNN to determine a position of the eye in the image.

For example, when coordinates of a position of a center point (e.g., central region, e.g., a pupil region may be the position) of an eye of a face obtained by detecting a position of the eye in a face image by using the MTCNN are (x1, y1) and (x2, y2), the electronic device may determine, as an eye region in the image, a rectangular region of which a center point is (x1, y1) and a length of a side is d and a rectangular region of which a center point is (x2, y2) and a length of a side is d. For example, for an image of the size of 100×100, the electronic device may determine, as an eye region, two rectangular regions of which center points are (x, y1) and (x2, y2) and the lengths of the sides are 50 and 50. A weight of a point in a second weight map corresponding to the eye region in the image may be greater than that of another region of the face.

In operation 203, the electronic device may obtain a target feature map of the image based on the target information, and possibly also an image feature of the image. The electronic device may obtain the target feature map based on any combination of one or more of the six methods of obtaining the target information in operation 202 described above.

In a first method corresponding to the first method in operation 202, the electronic device may obtain the target feature map based on a second feature map of a specific portion of the image and frontal facial features.

The electronic device may extract features of the specific portion of the image and obtain the second feature map of the portion of the image. The second feature map may be used to characterize the features of the portion of the image. The electronic device may obtain the target feature map by stitching the frontal facial features and the second feature map. For example, the electronic device may crop the image based on the specific portion to obtain an image of the specific portion, and extract features from the image of the specific portion to obtain the second feature map. The electronic device may stitch the frontal facial features and the second feature map to obtain the target feature map.

In an example, the specific portion may include at least one of an eye portion or a facial feature portion. The facial feature portion may include at least one of an eye portion, a mouth portion, a nose portion, an ear portion, an eyebrow portion, or any other discernible feature. For example, when the specific portion includes an eye, the electronic device may detect the eye in the image to obtain a position of the eye in the image, and crop the image based on the position of the eye to obtain an image of an eye region. The electronic device may extract features from the image of the eye region to obtain the second feature map representing a feature of the eye. The electronic device may stitch the frontal facial features and the second feature map representing the feature of the eye to obtain the target feature map. For another possible example, when the specific portion includes facial features, the electronic device may detect the facial features in the image to obtain positions of the facial features in the image, and crop the image based on the positions of the facial features to obtain an image of a facial feature region. The electronic device may extract features from the image of the facial feature region to obtain the second feature map representing the facial features. The electronic device may stich the frontal facial features and the second feature map representing the facial features to obtain the target feature map.

For example, the electronic device may implement operations in the first method of operations 2021A to 2023A described above and operation 203, using a transformer model. The electronic device may configure a spatial transformer network in the transformer model, and the spatial transformer network may extract features of the image based on a spatial distribution. The spatial transformer network may include a transformer, an encoder, and a perceptron. In the first method of operations 202 and 203, the spatial transformer network may extract an image feature of the image using the encoder of the spatial transformer network, and obtain a facial map, a facial mask, and an eye position from the image through a multi-layer perceptron with three independent layers of the spatial transformer network. The layers of the multi-layer perceptron may be fully connected, and the corresponding facial map, the facial mask, and the eye position may be obtained using a fully connected layer and convolutional network structure of the multi-layer perceptron. Further, the encoder of the spatial transformer network may extract frontal facial features of a first front image. A second feature map of the eye position may be stitched with the frontal facial features. In addition, by further performing convolution on the stitched feature map, a final target feature map may be obtained.

Figure 7:
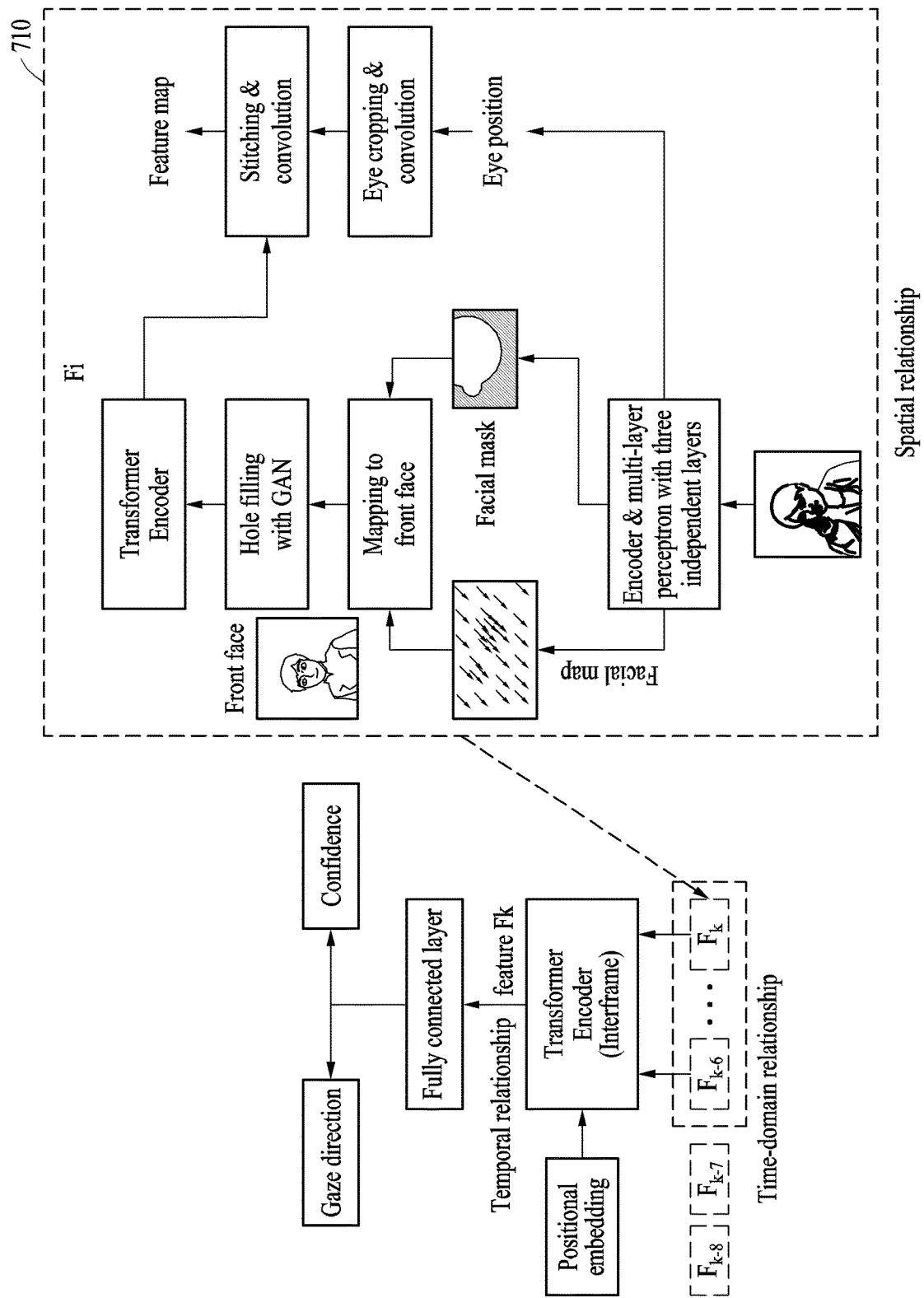
FIG. 7 illustrates a spatial transformer network configured to extract a spatial relationship, according to one or more embodiments.

Referring to FIG. 7, a right portion illustrates a spatial transformer network 710 configured to extract a spatial relationship. For example, when a face image is an image of a single face, the electronic device may input the single face image to the spatial transformer network 710 and obtain a feature map using an encoder of the spatial transformer network 710, and may then divide the feature map into three sets of information using a convolutional layer and a fully connected layer. That is, using a multi-layer perceptron with three independent layers, the electronic device may obtain the three sets of information. The three sets of information may include a facial map, a facial mask, and an eye position. The facial map may reflect therein an offset of each pixel of a face with respect to a front face. The electronic device may obtain a front image by offsetting pixels of the image based on the facial map, the facial mask, and the image, and then mapping the face to the front face. For example, the electronic device may move some of the pixels of the image that are not covered by the facial mask (i.e., face pixels). In addition, the electronic device may fill a hole in the front image using a GAN to obtain a full front image. Thus, the electronic device may extract features from the full front image by the encoder of the spatial transformer network 710, such extracted features being the frontal facial features. In addition, the electronic device may (i) crop the original image using the eye position, (ii) extract features of an eye image obtained by the cropping through the convolutional layer, and (iii) stitch the eye features and the frontal features to obtain the target feature map. The convolution layer may also extract features, from a result of the stitching, to obtain the target feature map.

In a second method corresponding to the second method of operation 202, the electronic device may obtain the target feature map of the image based on a first feature map of two frame images and temporal relationship information between the two frame images.

The electronic device may extract features from each of the frame images and obtain a first feature map of each respective frame image. The electronic device may input the temporal relationship information and the first feature maps of the respective frame images to a transformer network. The electronic device may then extract the features based on the temporal relationship information and the first feature maps through an encoder of the transformer network, to thereby obtain the target feature map of the image. For example, for a kth frame image, the electronic device may obtain temporal relationship information between a total of seven frame images including a k-6th frame image, a k-5th frame image, . . . , a k-1th frame image, and the kth frame image, and may then input first feature maps of the respective seven frame images and the temporal relationship information to the transformer network. The electronic device may further perform feature extraction on an interframe relationship among the seven frame images and obtain a target feature map of the kth frame image (the target feature map reflecting information in the 6 prior frame images and relative capture times thereof, for example).

In an example, the first feature map of each corresponding frame image may be extracted based on the encoder of the transformer network.

In a third method corresponding to the third method of operation 202, the electronic device may obtain a third feature map of the image based on frontal facial features of the image and a second feature map of a specific portion of the image. For example, the electronic device may obtain the target feature map based on a third feature map of two frame images and temporal relationship information between the two frame images.

The electronic device may obtain the third feature map by stitching the frontal facial features and the second feature map of the specific portion of the image. The specific portion may include at least one of an eye portion or a facial feature portion. The facial feature portion may include at least one of an eye portion, a mouth portion, a nose portion, an ear portion, or an eyebrow portion. A process of obtaining the second feature map of the specific portion may be the same as the process of obtaining the second feature map in the first method of operation 203, and a process of obtaining the third feature map by stitching the frontal facial features and the second feature map may be the same as the process of obtaining the target feature map by stitching the frontal facial features and the second feature map in the first method of operation 203.

The electronic device may input the temporal relationship information and the third feature maps of the respective frame images to the transformer network, and the encoder of the transformer network may extract features based thereon to obtain the target feature map of the image.

For example, when the image is a kth frame image in a sequence of frame images, the electronic device may obtain temporal relationship information among a total of seven frame images including a k-6th frame image (i.e., a frame image 6 frames before the kth frame image), a k-5th frame image, . . . , a k-1th frame image, and the kth frame image, and input third feature maps of the respective seven frame images and the temporal relationship information (e.g., relative capture times of the frame images) to the transformer network. The electronic device may further extract a relationship between/among the seven frame images to extract features, and obtain a target feature map of the kth frame image.

As illustrated in FIG. 7, in the third method, a gaze estimation method based on a spatio-temporal transformer model may be provided. The foregoing operations 202 and 203 may be implemented using an attention mechanism in the transformer model, and the electronic device may obtain a temporal relationship between neighboring (consecutive) frame images and a space domain feature of the image. For example, for a face image, the electronic device may input K neighboring frame face images, process each image with a spatial transformer network, and input K obtained feature maps back to a temporal transformer network. For example, when using seven neighboring (consecutive) face frame images, the electronic device may input seven feature maps Fk-6, . . . , and Fk as illustrated in FIG. 7 to the temporal transformer network. In this example, positional embedding (e.g., ordering information) may represent temporal relationship information of the seven face images, which may be a temporal order (7, 6, 5, 4, 3, 2, 1) of the seven face images, for example. The electronic device may obtain a target feature map of the Kth frame face image through the seven feature maps of the seven neighboring frame face images and the positional embedding, and may thereby obtain features including both a spatial relationship and a temporal relationship (i.e., spatio-temporal features may be obtained). In addition, by performing regression on the spatio-temporal features, the electronic device may obtain a finally estimated gaze direction and a corresponding confidence (e.g., probability) thereof. The spatial transformer network (e.g., the spatial transformer network 710) may obtain a front face/image using a face image and extract features therefrom. For example, for a single face image, the electronic device may obtain a front image (having a region to be filled) by performing front mapping using the transformer, and then fill a region thereof using the GAN. The electronic device may again execute the encoder of the transformer network for a full front image obtained by filling the image, and obtain frontal facial features based on the filled/full front image. The electronic device may obtain a feature map by stitching the frontal facial features of the full front image and features of an eye position and further performing convolution. The electronic device may input a target feature map of a neighboring image of the kth frame to the temporal transformer network and estimate a gaze. A two-step transformer model may be used herein to extract spatio-temporal relationship features. In comparison to a CNN, the transformer model may effectively extract a feature relationship between regions having a great distance therebetween in an image, effectively represent a spatio-temporal relationship of different feature regions, and directly obtain an offset of each pixel with respect to a front face in the image in the case of mapping to the front face.

Potentially advantageous effects of some implementations of the third method may be as follows.

The electronic device may obtain a first front image based on a facial map and a facial mask, obtain frontal facial features based on the first front image, and obtain a target feature map based on the frontal facial features and a second feature map of a specific portion of an image. Thus, the target feature map may represent the frontal facial features and original facial features of an original image. By estimating a gaze by using the frontal facial features and combining the original facial features, it is possible to reduce the influence of head pose on the accuracy of gaze estimation, even for a small sample size. For example, a pose with the head tilted left and right may have a great influence on gaze estimation, and such a wide range of head pose may be exacerbated when there is a small sample size. In this example, by estimating a gaze based on the frontal facial features, it is possible to more readily obtain an accurate and effective estimation result despite a wide range of head pose. In addition, it is possible to improve the accuracy, robustness, and practicality of gaze estimation.

In addition, the electronic device may map the image to the front through the facial map to obtain a second front image, and obtain a full first front image by further filling any gaps in the image that may result from the re-orienting to a front-facing image. The facial map may accurately represent an offset level of each point in the image with respect to the front face, and thus the electronic device may make a point in the image more precise and offset a point of the face in the image, and fill (reconstruct or estimate) the second front image to increase the accuracy in acquisition of a front image. In addition, the electronic device may subsequently use the front image of higher precision for gaze estimation to improve the robustness of gaze estimation.

In addition, the electronic device may obtain the first front image by offsetting the face with the facial mask, obtaining the second front image, and filling, with an image, a position to be filled using a hole mask. The electronic device may perform front face mapping corresponding to the face in the image and fill the position (e.g., gap) to prevent an interference of an unrelated region and improve further an efficiency of obtaining a front image and an efficiency of processing subsequent gaze estimation.

Further, the electronic device may obtain the target feature map by combining temporal relationship information between two or more frame images. The electronic device may allow the target feature map to represent both a spatial relationship feature and a temporal relationship feature and perform estimation using these target features, thereby further improving the robustness of gaze estimation.

In a fourth method corresponding to the fourth method of operation 202, the electronic device may obtain a target feature map based on a fourth feature map of an image and relative distance information between pixels.

The electronic device may stitch the fourth feature map and the relative distance information to obtain the target feature map. For example, for each first feature point of the fourth feature map, the electronic device may stitch a feature vector of a first feature point and a distance vector of relative distance information of the first feature point to obtain the target feature map. The target feature map may include the feature vector and the relative distance information of the first feature point.

In an example, the electronic device may obtain a fused feature map based on the fourth feature map of the image and the relative distance information between pixels, and obtain the target feature map based on the fused feature map. For example, the electronic device may stitch a feature vector of first feature points and a distance vector of relative distance information of the first feature points to obtain the fused feature map, and further extract features from the fused feature map through a convolutional layer to obtain the target feature map.

In another example, the electronic device may obtain a fused feature map based on the fourth feature map of the image and the relative distance information between pixels, and obtain the target feature map based on the fused feature map and the fourth feature map. For example, the electronic device may stitch a feature point of first feature points and a distance vector of relative distance information of the first feature points to obtain the fused feature map. In this example, the electronic device may again perform feature fusion on the fused feature map and the fourth feature map and extract features from the fused feature map obtained through the convolutional layer to obtain the target feature map. The electronic device may also obtain the target feature map based on the fused feature map and the relative distance information. For example, the electronic device may obtain the target feature map by stitching the feature vector of the first feature points and the distance vector of the relative distance information of the first feature points to obtain the fused feature map, and by then again performing feature fusion on the fused feature map and the relative distance information and extracting features from a fused feature map obtained by performing the fusion again through the convolutional layer In some implementations, potentially advantageous effects of the fourth method may be as follows.

The electronic device may obtain the fourth feature map and the relative distance information of the image and stitch the fourth feature map and the relative distance information to obtain the target feature map, thereby allowing the fourth feature map to represent a distance between pixels of the image to effectively perform an entire subsequent task based on the relative distance information and improve the accuracy of subsequent gaze estimation.

In addition, the electronic device may obtain the relative distance information based on a distance between a second feature point and a neighboring point, and finally obtain the target feature map including a feature vector of first feature points and the relative distance information from the fourth feature map (which is a reduced low-resolution feature map obtained through downsampling). Thus, the target feature map may maintain a massive amount of information, and it is thus possible to effectively resolve an issue of maintaining the information when reducing an image to be processed.

In addition, previously techniques may not have (among other things) relative distance information or may not separate an image feature and a distance feature, and may thus be relatively rigid when performing a subsequent task using a feature map. According to an example embodiment, separating a fourth feature map representing an image feature and relative distance information and obtaining a new feature (i.e., a target feature map) by combining the two features may enable flexible processing of the relative distance information as needed and improve the flexibility of gaze estimation.

In addition, a number of distance function value(s) may be greater than a number of distance(s) (i.e., there may be more distance function values than distances), and a larger number of distance function values may be obtained even when a number of distances is small. Thus, it is possible to reduce the chance of distance information being lost, and realize accurate representations of image features, relative distance information, and the like, and improve the flexibility in acquisition of the accuracy of subsequent gaze estimation and acquisition of a feature map.

In a fifth method corresponding to the fifth method of operation 202, the electronic device may obtain the target feature map based on a first weight map and a fifth feature map.

The electronic device may obtain a current target feature map by assigning a weight to the fifth feature map based on the first weight map. For example, the electronic device may obtain the target feature map by performing point multiplication on the first weight map and the fifth feature map, correspondingly.

The electronic device may use a gaze estimation method based on a Gaze360 model and a spatial attention mechanism. The attention mechanism may be applied to a convolutional feature map obtained by convolution. For example, the fifth feature map may be an intermediate feature map or a final feature map that is obtained based on a CNN. For example, as illustrated in FIG. 6, the electronic device may obtain a feature map using a convolutional backbone network for each face image 610 and extract features from the feature map again using a convolutional network to obtain a weight map (i.e., the first weight map). The electronic device may obtain a new feature map by performing a vector multiplication (e.g., an elementwise multiplication) on the first weight map and the feature map. The new feature map may be transmitted to a subsequent bidirectional long short-term memory (LSTM) network to be used to estimate a gaze direction, and an output of the bidirectional LSTM network may pass through a fully connected layer to be used to obtain a gaze estimation result. For example, the gaze estimation result may include a gaze direction, a confidence, or the like.

Depending on implementation, possible advantageous effects of the fifth method may be as follows.

The electronic device may add the spatial attention mechanism to obtain the target feature map based on a position feature including importance information of each position in the image and an image feature, and assign a higher importance to a position with more information. The electronic device may thus select core information for gaze estimation and suppress unnecessary information to improve the robustness of gaze estimation. In addition, the electronic device may accurately represent the importance information of each position based on the first weight map of the image and assign a weight to the fifth feature map based on the first weight map to obtain the target feature map, and may thus allow the target feature map to accurately represent important and core information of the image and improve the accuracy of gaze estimation.

In a sixth method corresponding to the sixth method of operation 202, the electronic device may obtain the target feature map based on a second weight map and a sixth feature map of the image.

The electronic device may obtain a current target feature map by assigning a weight to the sixth feature map based on the second weight map.

In an example, the sixth feature map may be obtained through feature extraction from the image through at least two convolutional layers. The electronic device may obtain the target feature map using an intermediate feature map during a process of obtaining the second weight map and the sixth feature map. In the sixth method, in operation 203, the electronic device may obtain a seventh feature map based on the intermediate feature map and the second weight map. The sixth feature map may be obtained by extracting features from the image through the at least two convolutional layers, and the intermediate feature map may be output by a target layer of the at least two convolutional layers. The electronic device may obtain the target feature map based on the sixth feature map and the seventh feature map. In an example, the electronic device may obtain the seventh feature map by assigning a weight to the intermediate feature map based on the second weight map. The electronic device may obtain the target feature map by stitching the seventh feature map and the sixth feature map. For example, a weight processing process may include obtaining the seventh feature map by performing a pointwise multiplication on the second weight map and the intermediate feature map.

In another possible example, the electronic device may obtain the seventh feature map by assigning a weight to the intermediate feature map based on the second weight map. The electronic device may extract features from the seventh feature map through a convolutional layer to obtain a tenth feature map. In another possible example, the electronic device may obtain the target feature map by stitching the tenth feature map and the sixth feature map.

The target layer may be configured as needed and is not limited thereto. For example, the target layer may be a feature extraction layer configured to extract target feature data or a feature extraction layer positioned at a fixed network position.

Figure 8:
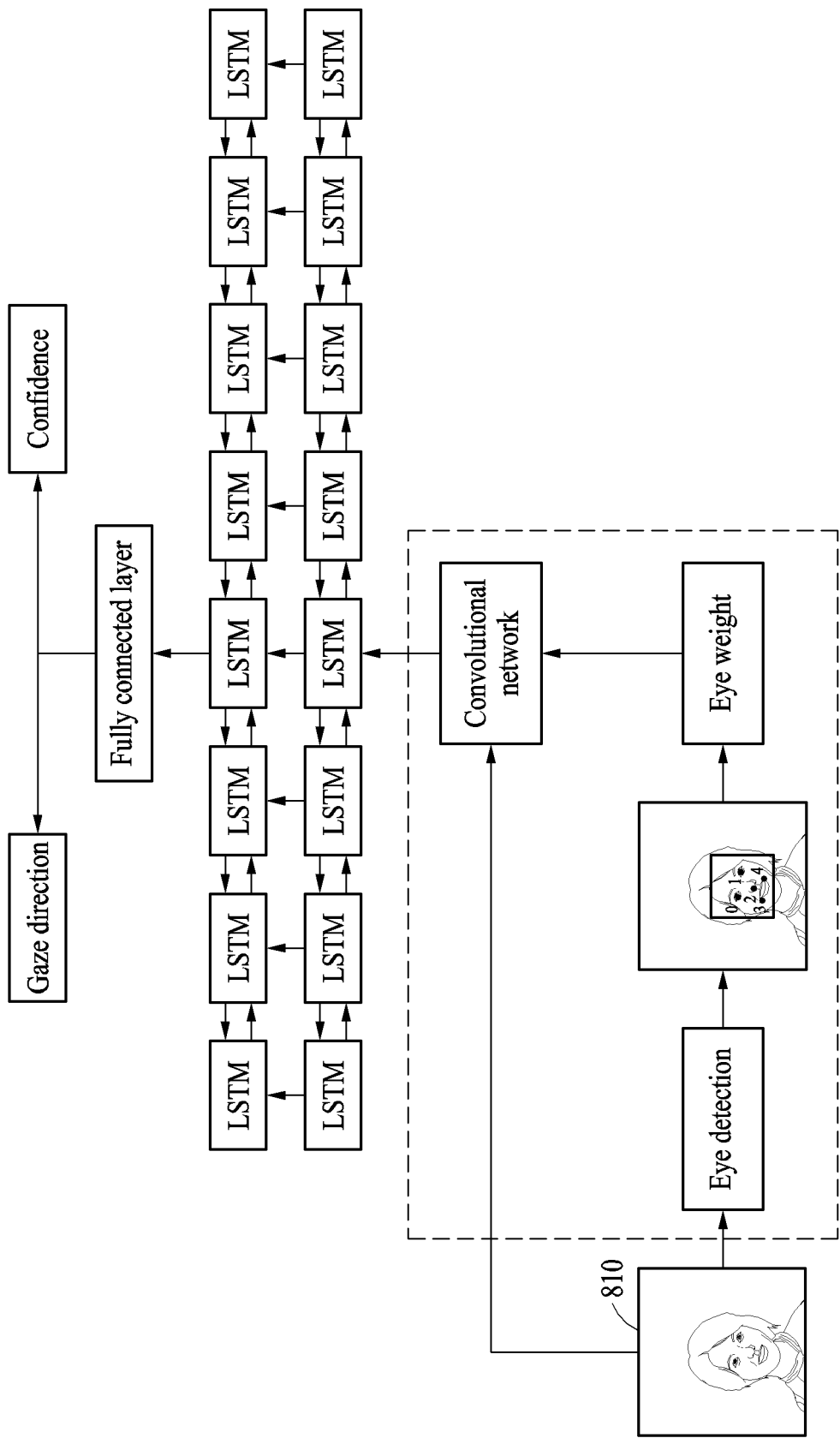
FIG. 8 illustrates an example of estimating gaze, according to one or more embodiments.

As illustrated in FIG. 8, in some embodiments the electronic device may detect an eye and obtain an eye position in a face image 810, and obtain a second weight map stressing a weight of the eye position based on the eye position. The electronic device may then assign weights to features extracted from a convolutional network based on the second weight map to finally obtain a target feature map, and may then input the target feature map to a bidirectional LSTM network to perform gaze estimation. For example, the electronic device may input the target feature map to the bidirectional LSTM network and allow a result output from the LSTM network to pass through a fully connected layer to obtain a gaze direction and a confidence thereof.

Figure 9:
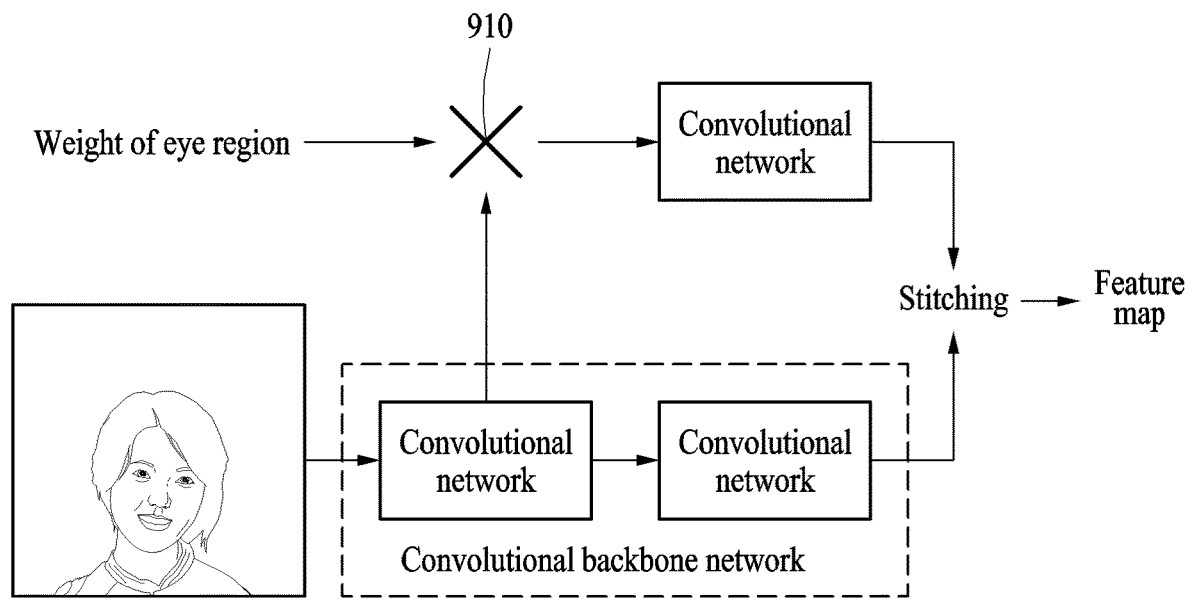
FIG. 9 illustrates an example of obtaining a target feature map, according to one or more embodiments.

In this example, the electronic device may obtain the target feature map by stitching a feature map obtained through weight processing and a feature map finally output from the convolutional network. For example, as illustrated in FIG. 8, the electronic device may obtain the target feature map by extracting features of the face image 810 using a convolutional backbone network, performing weight processing on the extracted features using a weight of an eye region, and stitching the extracted features and a weight-processed feature map obtained through the weight processing. For example, as illustrated in FIG. 9, the electronic device may perform a point multiplication 910 on an intermediate feature map extracted from a preset convolutional layer of the convolutional backbone network and a second weight map and obtain a weight-processed feature map obtained through weight processing, extract features from the weight-processed feature map using continuously the convolutional network, and stitch the processed feature map and a feature map finally output from the convolutional backbone network, thereby obtaining the target feature map.

In an example, the electronic device may (but need not) combine the foregoing six methods. For example, the electronic device may combine any two or more of the foregoing six methods to obtain the target feature map. For example, the electronic device may combine the fourth method and the fifth method. In this example, the electronic device may obtain a 11th feature map based on the fourth feature map of the image and the relative distance information between pixels, and obtain the first weight map of the image based on the 11th feature map. The electronic device may obtain the target feature map based on the first weight map and the 11th feature map. The electronic device may also combine the fourth method and the sixth method. The electronic device may also combine the third method and the fourth method. Alternatively, the first method and the second method may each be combined with the fourth method. The combination of the fourth method and the fifth method is described above as an example. However, which methods are to be used among the six methods in operations 202 and 203, how to combine them, and the execution order of them after the combination is not be limited to a particular example.

Depending on implementation, possible advantageous effects of the sixth method may be as follows.

A position feature may include importance information of an eye position, and the electronic device may estimate a gaze based on the importance information of the eye position and an image feature, and assign the importance information to a specific position in the image and intentionally divide core information for gaze estimation for an eye portion to improve the robustness of gaze estimation. In addition, the electronic device may detect a position of the eye portion and accurately assign a higher importance to an eye region in the image in the form of a second weight map for the eye portion, and assign a weight to the sixth feature map based on the second weight map to obtain the target feature map. Thus, the target feature map may more accurately represent more important and core information on the eye portion, enable estimation of a gaze of an eye, and better represent of eye movements, thereby improving the accuracy of gaze estimation.

In operation 204, the electronic device may perform gaze estimation on the image based on the target feature map.

The electronic device may obtain a gaze estimation result by performing the gaze estimation based on the target feature map, and the gaze estimation result may include a gaze direction and a confidence thereof. For example, the gaze direction may include a pitch angle and a yaw angle of a gaze, and the confidence may include a confidence of the gaze direction.

For example, for the first method, the second method, and the third method in operations 202 and 203, the electronic device may use a transformer model to perform the gaze estimation. For example, in the third method, the electronic device may output the gaze estimation result corresponding to the target feature map through a fully connected layer of the transformer model, and may, for example, output a gaze direction of a target object in the image and a confidence.

In an example, the electronic device may estimate a gaze by combining a pose of a target portion in the image. In this example, in operation 204, the electronic device may perform the gaze estimation on the image based on the target feature map and target pose information. The target pose information may be pose information of the target portion in the image. The target portion may be a head portion, for example. For example, when obtaining the target feature map based on frontal facial features according to the foregoing first and third methods, the electronic device may further obtain a head pose of the head in the image and adjust an initial gaze estimation result in a subsequent operation based on the head pose. In operation 204, the electronic device may obtain first gaze information by performing the gaze estimation on the target feature map, and obtain second gaze information corresponding to the image based on the head pose and the first gaze information. The head pose may include an angle or orientation of the head. For example, the angle of the head may include an angle in a vertical direction of the head, an angle in a horizontal direction of the head, or the like. Alternatively, the electronic device may represent the head pose using head pose parameters. The head pose parameters may include, for example, yaw, pitch, and roll, which may represent a face plane rotation, a vertical (up-down) parameter, and a horizontal (left-right) parameter, respectively. The first gaze information may include a first gaze angle, and the electronic device may adjust the first gaze angle of the first gaze information based on the angle of the head to obtain the second gaze information. The second gaze information may include a second gaze angle. For example, the second gaze information may further include a confidence. The target portion may also be another portion. Although the target portion is described herein as the head as an example, a detailed portion indicated by the target portion is not limited to a particular one.

In an example, according to the fourth method in operations 202 and 203, the electronic device may obtain the target feature map including an image feature and relative distance information, through a downsize network (e.g., DownsizeNet) of a CNN, and estimate a gaze based on the target feature map through a network model, such as, for example, a LSTM network, a VGG16 network, a ResNet, or the like.

In an example, according to the fifth method in operations 202 and 203, the electronic device may be based on a spatial attention mechanism added to a Gaze360 model, and may assign a weight based on a first weight map through the CNN to obtain the target feature map. According to the sixth method in operations 202 and 203, the electronic device may be based on a spatial attention mechanism of an eye region added by the Gaze360 model. For example, the electronic device may assign a weight to a second weight map through the CNN to obtain the target feature map. In the fifth and sixth methods, the obtained target feature map may be input to a bidirectional LSTM network.

Figure 10:
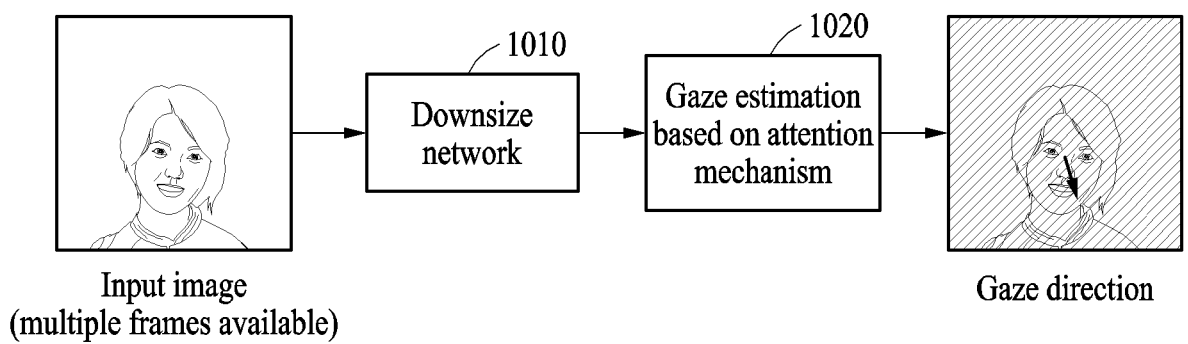
FIG. 10 illustrates an example of estimating a gaze, according to one or more embodiments.

For example, as illustrated in FIG. 10, when combining two of the foregoing six methods, the electronic device may obtain a feature map including relative distance information through a downsize network 1010 and may then estimate a gaze based on an attention mechanism 1020. For example, using the fourth method, the electronic device may obtain the feature map including the relative distance information through the downsize network 1010. Through any one of the first, second, third, fifth, and sixth methods described above, the electronic device may obtain the target feature map and perform the gaze estimation based on the target feature map, based on the attention mechanism 1020. For example, the electronic device may obtain a feature map including relative distance information through the foregoing fourth method; and obtain a second weight map of an image for an eye position and obtain a final target feature map based on the feature map including the relative distance information and the second weight map through the foregoing sixth method. The fourth method may also be combined with the first method, the second method, and the third method, and a detailed method of combining them may be the same as the method of combining the fourth method and the sixth method and a more detailed and repeated description thereof will be omitted here for conciseness. There is no limitation in which methods are to be combined, how to combine them, and the execution order of them after the combination.

The example embodiments described herein may be applicable to a 3D gaze estimation system. For a sequence of frame face images, a spatial relationship and a temporal relationship of image features may be effectively used. For example, through the first and fourth methods, the electronic device may obtain frontal facial features and a target feature map based on the frontal facial features. For example, when there is a great movement of a head pose of a target object, for example, when the head is tilted left or bowed, the gaze estimation method described herein may be implemented. The gaze estimation method may also be applicable to a situation in which the head pose is great (i.e., deviates significantly from "straight ahead") and may thus have a high level of robustness. For example, an image reduction method according to the first method may preserve image information while improving a model execution speed, and may thus minimize a loss of accuracy. For example, in the first method, the third method, and the sixth method, a greater attention may be paid to an important position, such as, for example, an eye position and facial feature positions. In comparison to related techniques that do not pay attention to such an important region as eyes, the gaze estimation method described herein may obtain a more accurate gaze estimation result. The example embodiments described herein may be applicable to a situation when there are greetings at meetings or head-up displays (HUDs) of vehicles, for example. Gaze estimation may be one of the desirable methods for human-computer interactions and may be more explicit and convenient than an interaction by indications with fingers.

Gaze estimation methods described herein may obtain target information of an image including at least one of attention information or a distance between pixels, obtain identifying information in the image by obtaining the attention information, and obtain the distance between pixels, thereby minimizing information loss of the image. In addition, gaze estimation methods may obtain a target feature map of the image based on the target information such that the target feature map effectively represents more identifying information in the image. In addition, the gaze estimation may perform gaze estimation on the image based on the target feature map to estimate a gaze of an eye in the image more accurately and improve the accuracy of gaze estimation.

Figure 11:
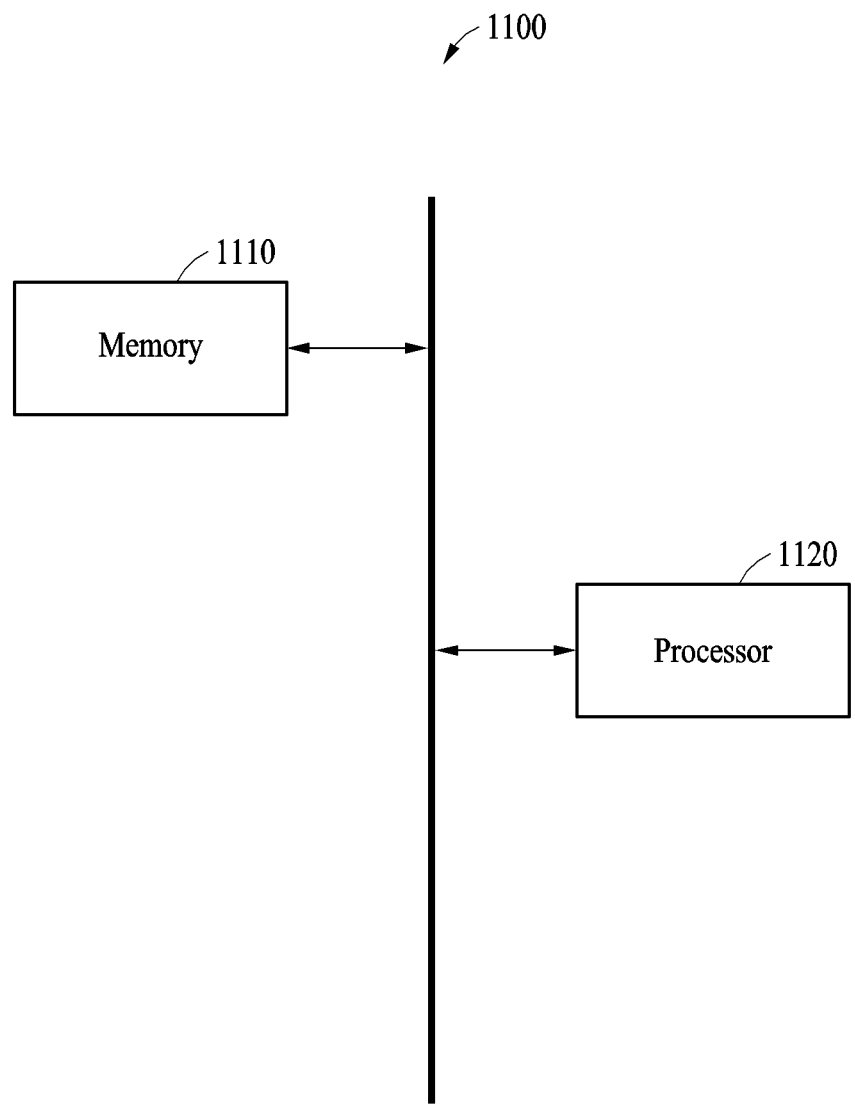
FIG. 11 illustrates an example of an electronic device, according to one or more embodiments.

FIG. 11 illustrates an example of an electronic device, according to one or more embodiments.

Referring to FIG. 11, an electronic device 1100 may include a memory 1110 and a processor 1120. The memory 1110 and the processor 1120 may communicate with each other through a bus, a peripheral component interconnect express (PCIe), and/or a network on a chip (NoC). The electronic device 1100 may include, for example, various computing devices (e.g., a cellular phone, a smartphone, a tablet PC, an e-book device, a laptop, a PC, a desktop, a workstation, or a server), various wearable devices (e.g., a smart watch, smart glasses, a head-mounted display (HMD), or smart clothes), various home appliances (e.g., a smart speaker, a smart television (TV), or a smart refrigerator), a smart vehicle, a smart kiosk, an Internet of things (IoT) device, a walking assist device (WAD), a drone, a robot, or the like.

The memory 1110 may include computer-readable instructions. As the instructions stored in the memory 1110 are executed by the processor 1120, the processor 1120 may perform the methods and operations described herein. The memory 1110 may be a volatile memory or a nonvolatile memory.

The processor 1120 may include, for example, a central processing unit (CPU) or a graphics processing unit (GPU) as a device for executing instructions or programs or controlling the electronic device 1100. The processor 1120 may obtain target information of an image including an eye of an object, obtain a target feature map representing information on the eye in the image based on the target information, and estimate a gaze of the eye included in the image based on the target feature map. The target information may include any one or two of attention information and a distance between pixels in the image.

In addition, the electronic device 1100 may process the methods and operations described above.

The computing apparatuses, the vehicles, the electronic devices, the processors, the memories, the displays, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method performed by an electronic device, the method comprising:
    obtaining target information of an image, the image comprising an eye;
    obtaining a target feature map representing information on the eye in the image, by extracting features from a first feature map of at least two frame images and the target information based on an offset between pixels of a face in the image and a first front image obtained by offsetting the pixels of the face in the image and applying a facial mask covering a region other than the face in the image to the image; and
    performing gaze estimation for the eye in the image based on the target feature map,
    wherein the target information comprises either attention information on the image, or a distance between pixels in the image, or both,
    wherein the attention information comprises temporal relationship information between the at least two frame images and frontal facial features of the face or a head, and
    wherein the frontal facial features are determined based on obtaining a facial map and the facial mask of the image.

2. The method of claim 1, wherein the obtaining of the target feature map comprises:
obtaining the target feature map of the image based on the first feature map of the at least two frame images and the temporal relationship information between the at least two frame images.

3. The method of claim 1, wherein the obtaining of the target feature map comprises:
obtaining the target feature map based on a second feature map of a specific portion of the image and the frontal facial features,
wherein the specific portion comprises one or at least two of eye, mouth, nose, ear, and eyebrow portions of the face or the head.

4. The method of claim 1, wherein the obtaining of the target feature map comprises:
obtaining a third feature map of the image based on the frontal facial features and a second feature map of a portion of the image; and
obtaining the target feature map based on a third feature map of the at least two frame images and the temporal relationship information between the at least two frame images.

5. The method of claim 4, wherein the frontal facial features are determined based on:
obtaining the first front image based on the image, the facial map, and the facial mask; and
obtaining the frontal facial features based on the first front image,
wherein the facial map comprises the offset of each pixel of the face in the image.

6. The method of claim 5, wherein the obtaining of the first front image comprises:
obtaining, based on the image, the facial map, and the facial mask, a second front image comprising a region of facial data, the region of facial data surrounding a hole region that lacks facial data;
obtaining a hole mask of the second front image and a third front image, based on the second front image; and
obtaining the first front image based on the second front image, the hole mask, and the third front image,
wherein the hole mask masks an image region other than the hole region in the second front image, and
the third front image comprises an image region corresponding to a position of the hole region in the second front image.

7. The method of claim 1, wherein the target information comprises the distance between pixels, and wherein the obtaining of the target feature map comprises:
obtaining the target feature map based on a fourth feature map of the image and relative distance information between the pixels.

8. The method of claim 1, wherein the target information comprises weight information, and wherein the obtaining of the target information comprises obtaining a first weight map of the image based on a fifth feature map of the image, and wherein
the obtaining of the target feature map comprises obtaining the target feature map based on the first weight map and the fifth feature map.

9. The method of claim 1, wherein the attention information comprises weight information, and wherein the obtaining of the target information comprises obtaining a second weight map based on a position of the eye in the image, and wherein the obtaining of the target feature map comprises obtaining the target feature map based on the second weight map and a sixth feature map of the image, and
wherein the sixth feature map is obtained by extracting features from the image through at least two convolutional layers.

10. The method of claim 9, wherein the obtaining of the target feature map comprises:
obtaining a seventh feature map based on the second weight map and an intermediate feature map; and
obtaining the target feature map based on the sixth feature map and the seventh feature map,
wherein the intermediate feature map is a feature map output by a target layer among the at least two convolutional layers.

11. The method of claim 1, wherein the performing of the gaze estimation comprises performing the gaze estimation on the image based on the target feature map and target pose information, and
wherein the target pose information is pose information of a target portion in the image.

12. A non-transitory computer-readable storage medium storing instructions that, when executed by a processor, cause the processor to perform the method of claim 1.

13. An electronic device, comprising:
a processor; and
a memory comprising instructions executable by the processor,
wherein, when the instructions are executed by the processor, the processor is configured to obtain target information of an image comprising an eye, obtain a target feature map representing information on the eye in the image by extracting features from a first feature map of at least two frame images and the target information based on an offset between pixels of a face in the image and a first front image obtained by offsetting the pixels of the face in the image and applying a facial mask covering a region other than the face in the image to the image, and perform gaze estimation for the eye in the image based on the target feature map,
wherein the target information comprises any either attention information on the image, or a distance between pixels in the image, or both,
wherein the attention information comprises temporal relationship information between the at least two frame images and frontal facial features of the face or a head, and wherein the frontal facial features are determined based on obtaining a facial map and the facial mask of the image.

14. The electronic device of claim 13, ; wherein when the instructions are executed by the processor, the processor is further configured to:
obtain the target feature map of the image based on the first feature map of the at least two frame images and the temporal relationship information between the at least two frame images.

15. The electronic device of claim 13, wherein the processor is configured to:
obtain the target feature map based on a second feature map derived from a specific portion of the image and based on the frontal facial features,
wherein the specific portion comprises eye, mouth, nose, ear, or eyebrow portions of the face or head.

16. The electronic device of claim 13, wherein when the instructions are executed by the processor, the processor is further configured to:

obtain a third feature map of the image based on the frontal facial features and a second feature map of a specific portion of the image; and obtain the target feature map based on a third feature map of the at least two frame images and the temporal relationship information between the at least two frame images.

17. The electronic device of claim 16, wherein the frontal facial features are determined based on the following operations:

obtaining the first front image based on the image, the facial map, and the facial mask; and obtaining the frontal facial features based on the first front image, wherein the facial map comprises the offset of each pixel of the face in the image.

18. The electronic device of claim 17, wherein when the instructions are executed by the processor, the processor is further configured to:

obtain a second front image in which a hole is present in a facial region based on the image, the facial map, and the facial mask, wherein the hole comprises a region of the second front image that was not generated based on the image, the facial map, and the facial mask;

obtain a hole mask of the second front image and a third front image, based on the hole of the second front image; and obtain the first front image based on the second front image, the hole mask, and the third front image, and the third front image comprises an image region corresponding to a position of the hole in the second front image.

19. The electronic device of claim 13, wherein the target information comprises the distance between the pixels, and wherein when the instructions are executed by the processor, the processor is further configured to:

obtain the target feature map based on a fourth feature map of the image and relative distance information between the pixels.

20. The electronic device of 13, wherein the target information comprises weight information, and wherein when the instructions are executed by the processor, the processor is further configured to:

obtain a first weight map of the image based on a fifth feature map of the image; and obtain the target feature map based on the first weight map and the fifth feature map.

* * * * *